(12) United States Patent
Li et al.

(10) Patent No.: US 7,705,577 B2
(45) Date of Patent: Apr. 27, 2010

(54) DIGITAL POWER SUPPLY CONTROL

(75) Inventors: Jian Li, Blacksburg, VA (US); Yang Qiu, Blacksburg, VA (US); Ming Xu, Blacksburg, VA (US); Fred C. Lee, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 586 days.

(21) Appl. No.: 11/755,331

(22) Filed: May 30, 2007

(65) Prior Publication Data

US 2008/0298090 A1 Dec. 4, 2008

(51) Int. Cl.
*G05F 1/00* (2006.01)
(52) U.S. Cl. ...................................... 323/283
(58) Field of Classification Search .................. 323/282, 323/283
See application file for complete search history.

(56) References Cited

U.S. PATENT DOCUMENTS

| | | | | |
|---|---|---|---|---|
| 6,933,709 | B2 * | 8/2005 | Chapuis | 323/282 |
| 7,141,956 | B2 * | 11/2006 | Chapuis | 323/283 |
| 7,206,343 | B2 * | 4/2007 | Pearce | 327/158 |
| 7,301,488 | B2 * | 11/2007 | Leung et al. | 323/283 |
| 7,317,625 | B2 * | 1/2008 | Zhang et al. | 323/222 |
| 7,394,236 | B2 * | 7/2008 | Chapuis et al. | 323/283 |
| 7,595,686 | B2 * | 9/2009 | Maksimovic et al. | 327/540 |
| 2004/0196014 | A1 * | 10/2004 | Chapuis | 323/283 |
| 2006/0043954 | A1 * | 3/2006 | Markowski | 323/283 |
| 2006/0055574 | A1 * | 3/2006 | Maksimovic et al. | 341/155 |
| 2007/0182391 | A1 * | 8/2007 | Chapuis et al. | 323/282 |

\* cited by examiner

*Primary Examiner*—Bao Q Vu
*Assistant Examiner*—Jue Zhang
(74) *Attorney, Agent, or Firm*—Whitham, Curtis, Christofferson & Cook, P.C.

(57) ABSTRACT

A switched voltage regulator provides improved regulation at a lower clock rate/sampling frequency (e.g. several orders of magnitude lower than would be required for comparable regulation) while using a low resolution digital pulse width modulator such that limit cycle oscillations occur (and thus of low cost and complexity and small size) by limiting the amplitude of limit cycle oscillations which therefore need not be avoided by more complex arrangements which are not commercially feasible. Limiting of amplitude of limit cycle oscillations is achieved by adding essentially a digitized ripple voltage signal corresponding to the difference between the output of the voltage regulator and an average output of the voltage regulator as an input to the digital pulse width modulator. Performance of this arrangement may be enhanced by adding a ramp signal to the digitized ripple voltage signal and even further enhanced by limiting the ramp signal to a range which corresponds to steady state operation but not transients.

19 Claims, 6 Drawing Sheets

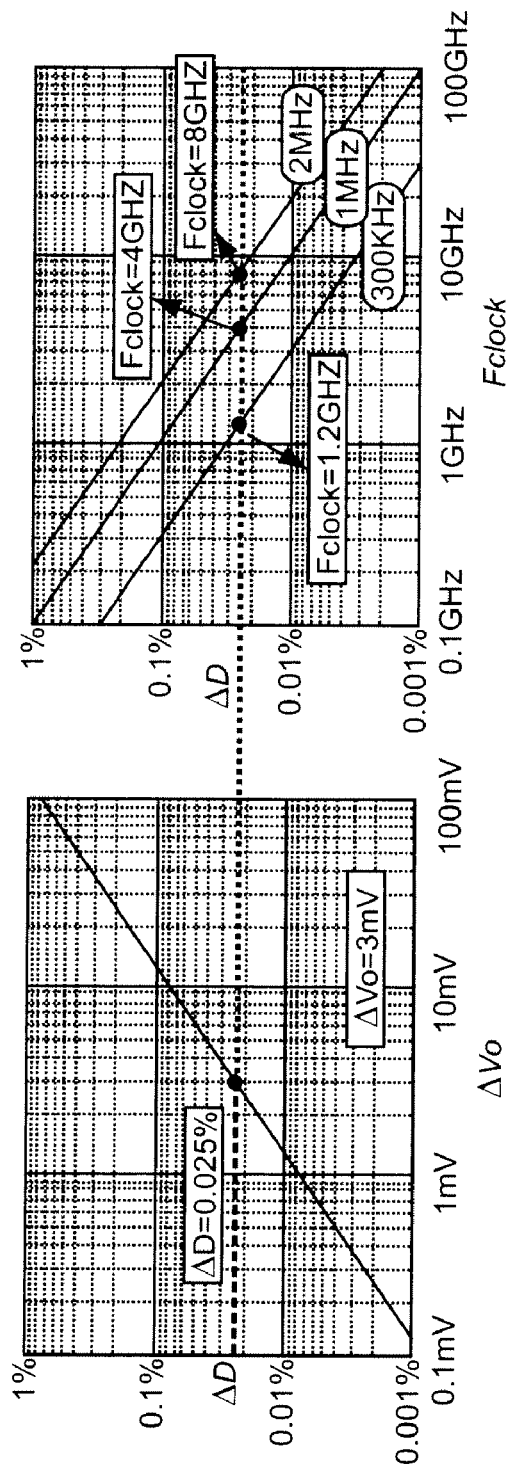
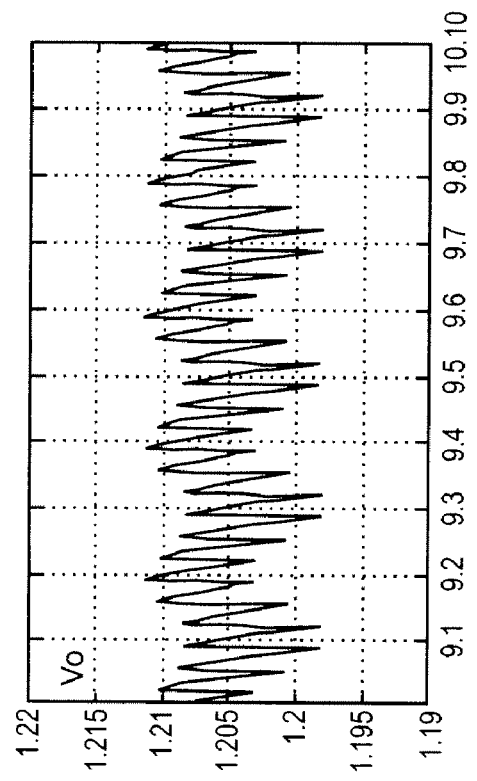
Figure 4
Figure 5

DIGITAL POWER SUPPLY CONTROL

BACKGROUND OF THE INVENTION

1. Field of the Invention

The present invention generally relates to control of power supplies and voltage regulators/power converters and, more particularly, to high-resolution control of voltage regulation with digital pulse width modulation arrangements of reduced resolution and consequent reduced complexity and cost.

2. Description of the Prior Art

Many types of electrical and electronic devices require power at a substantially constant voltage, although the tolerance for voltage variation of the power supply can vary widely. However, in general, voltage regulation within a relatively small tolerance over a wide range of current loads is highly desirable even though the current load can cause variation in the voltage supplied. Efficiency of the power supply and voltage regulation arrangement is also of high importance, along with cost and complexity of the voltage regulation arrangement.

For these reasons, switching power supplies are commonly the basic design of choice over analog voltage regulators which often rely upon a significant voltage drop across the regulator at significant currents and thus generally consume significant power, whereas switching voltage regulators control the output voltage over a wide range of current loads by variation of the duty cycle during which input power is connected to the regulator circuit. Analog pulse width modulators have provided good performance but are generally more expensive, subject to noise and often require designs to be specific to particular applications. More recently, digital control has been employed in switching voltage regulators which overcome many of the drawbacks of analog controls and provide more functions more conveniently and at generally reduced cost to improve overall system performance, such as passive component reduction, noise immunity, re-programmability, communication and the like.

However, an analog power stage (e.g. a switching regulator having analog components) with a digital control loop makes system control more complicated since two quantizers, a digital pulse width modulator (DPWM) 10 and an analog to digital (A/D) converter 20 are introduced into the control loop as shown in FIG. 1. Further, the duty cycle established by the DPWM can only assume discrete values which may or may not coincide with a desired output voltage at a particular load while the resolution of the discrete duty cycle values ($\Delta D$) ultimately determines the resolution of the regulated output voltage ($\Delta V_o$, depicted by the difference/space between dotted lines in FIGS. 2 and 3). That is, if the resolution of the DPWM is not sufficiently high for the desired output voltage to fall within a "zero error" value of A/D converter of resolution $\Delta V_{ADC}$, depicted as a difference between solid lines, limit cycle oscillations will occur as shown in FIG. 2, as contrasted with a high resolution DPWM; the response of which is shown in FIG. 3. Such limit cycle oscillations and their amplitude and waveform, in particular, are difficult to predict but are significantly more likely to occur using a low resolution DPWM than when using a high resolution DPWM. If limit cycle oscillations occur, the amplitude of the limit cycle oscillations will exceed the resolution of the A/D converter. Thus it is clearly seen that there is a significant trade-off between cost of the A/D converter and DPWM to obtain a given degree of duty cycle resolution and the ability to reliably regulate voltage within a given voltage tolerance.

As a result of such a trade-off, many DPWM arrangements have been proposed to obtain high duty cycle resolution. For example, in a counter based DPWM, the duty cycle resolution ($\Delta D$) is given by $$\Delta D = f_{sw}/f_{clock} \qquad (1)$$

where $f_{sw}$ is the switching frequency of the power stage (e.g. Q1 and Q2 of FIG. 1) and $f_{clock}$ is the controller system clock. Taking the buck converter arrangement of FIG. 1 as an example, the output voltage resolution ($\Delta V_O$) is given by $$\Delta V_o = V_{IN} \cdot \Delta D \qquad (2)$$

where $V_{IN}$ is the input voltage. Accordingly, it is seen from FIG. 4 that the system clock ($f_{clock}$) requirement to achieve a 3 mV output voltage resolution (notwithstanding limit cycle oscillations as shown in FIG. 5) under different switching frequency ($f_{sw}$) conditions generally exceed 1 GHz for common or increased $f_{sw}$ which is not feasible for practical implementations.

SUMMARY OF THE INVENTION

It is therefore an object of the present invention to provide a practical digital pulse width modulation (DPWM) arrangement in a switching voltage regulator which can hold the amplitude of limit cycle oscillations to low and predictable levels.

In order to accomplish these and other objects of the invention, a power converter including a digital pulse width modulator of low resolution such that limit cycle oscillations occur is provided including a feedback control arrangement for controlling the digital pulse width modulator wherein the feedback control arrangement includes a sampling arrangement and analog to digital converter, an outer control loop for comparing an output voltage of the power converter with a reference voltage and providing an output corresponding to an average difference between the output voltage and the reference voltage, and an inner control loop including an arrangement for providing a signal corresponding to a difference between the output voltage and the output of the outer control loop.

In accordance with another aspect of the invention, a method of voltage regulation using a switched voltage regulator controlled by a digital pulse width modulator of low resolution such that limit cycle oscillations occur responsive to an output voltage of the voltage regulator wherein the method comprises steps of providing a average of the output voltage of the voltage regulator in an outer feedback loop to the digital pulse width modulator, providing a signal corresponding to a difference between an output voltage of the voltage regulator and the average of said output voltage of the voltage regulator in an inner feedback loop to the digital pulse width modulator.

BRIEF DESCRIPTION OF THE DRAWINGS

The foregoing and other objects, aspects and advantages will be better understood from the following detailed description of a preferred embodiment of the invention with reference to the drawings, in which:

FIG. 4 illustrates graphical determination of $f_{clock}$ requirements for different voltage regulator system switching frequencies, FIG. 5 illustrates an exemplary waveform of limit cycle oscillations.

DETAILED DESCRIPTION OF A PREFERRED EMBODIMENT OF THE INVENTION

Figure 1:
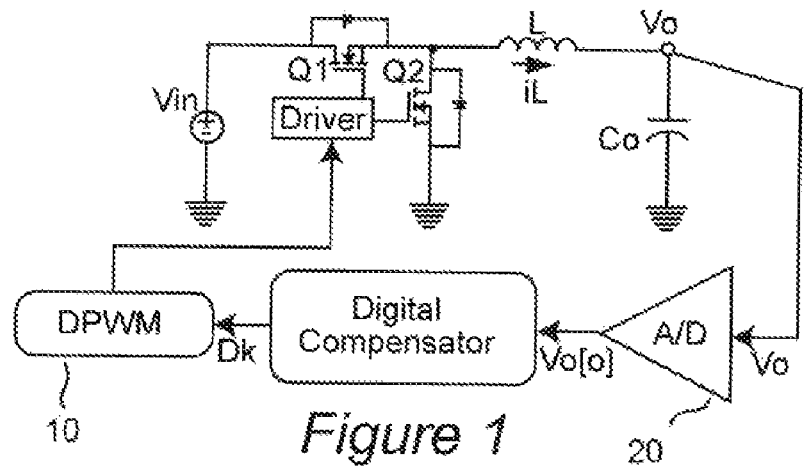
FIG. 1 is a schematic diagram of an exemplary switching voltage regulator/power converter arrangement including a digital pulse width modulator (DWPM), FIG. 2 graphically illustrates limit cycle oscillation using a low resolution DPWM, FIG. 3 graphically illustrates avoidance of limit cycle oscillations using a high resolution DPWM.
Figure 2:
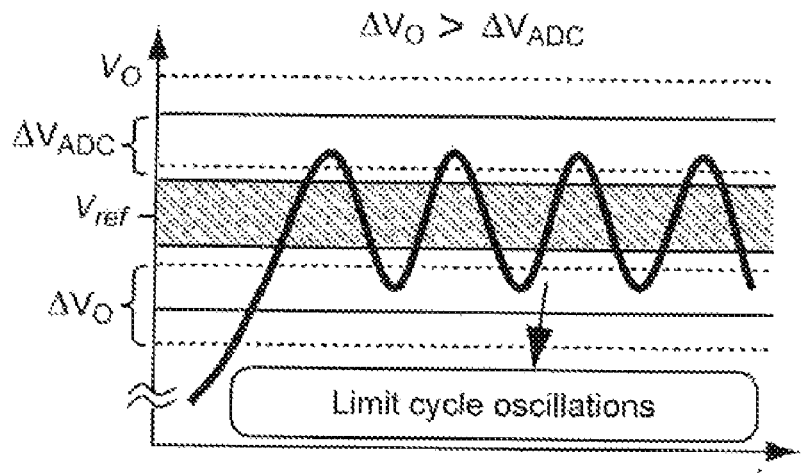
Figure 3:
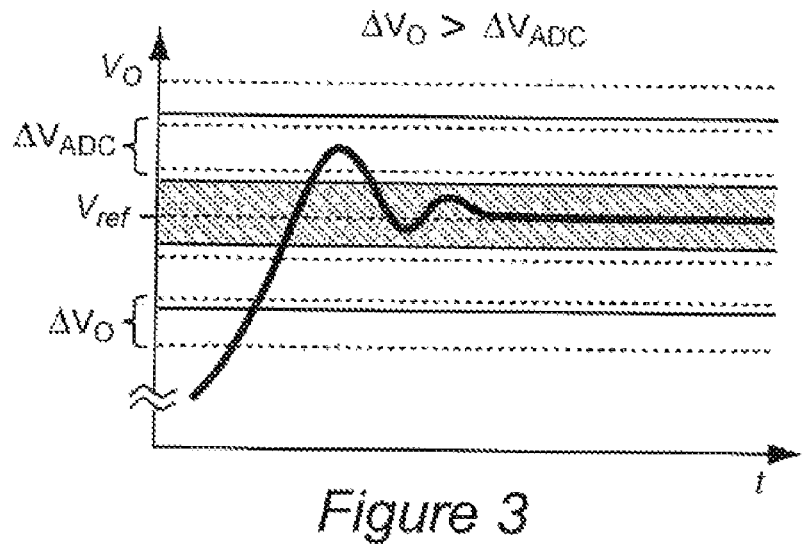

Referring now to the drawings, and more particularly to FIGS. 1-4, as discussed above, it is clearly seen that high clock rates are not practical for achieving adequately high voltage resolution while using a relatively low resolution digital pulse width modulator (DPWM). As an alternative to such high system clock frequencies, use of delay lines has been proposed but requires an impractical amount of chip space. Dithering techniques have also been proposed to increase the effective resolution of the DPWM but additional voltage ripple is caused by the dithered duty cycle which limits the potential benefits of such techniques. As can be readily appreciated from the waveforms of limit cycle oscillations as illustrated in FIG. 5, not only does the voltage oscillate at a high frequency but, under load, the high-frequency voltage oscillations are effectively superimposed on a lower frequency near-sinusoidal ripple having a magnitude which is, by itself, comparable to the maximum amplitude of the voltage regulation tolerance acceptable in many applications and unacceptable in many others. Moreover, the amplitude of the voltage variation is largely unpredictable since it results from uncontrolled and unavoidable oscillations due to insufficient resolution at the DPWM.

Previous studies of this problem have been based on voltage-mode digital control structures as illustrated in FIG. 1, as discussed above. If a low resolution DPWM is used in such an arrangement, limit cycle oscillations are virtually unavoidable because a voltage-mode digital control arrangement can only control the average value of the output voltage. The actual amplitude of the limit cycle oscillations, although greater than the resolution of the A/D converter, are very difficult to predict for the same reason and it is impossible to meet tight voltage regulation specifications where the possibility of unpredictable limit cycle oscillations exists.

Figure 6A:
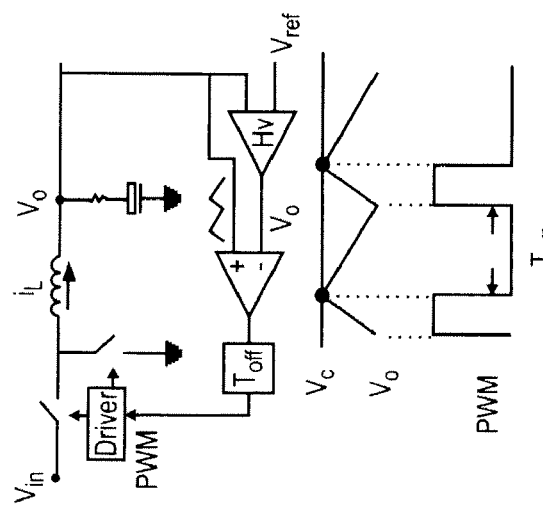
FIGS. 6A, 6B and 6C are schematic diagrams of exemplary hysteretic, constant on-time and constant off-time duty cycle control arrangements, respectively.

The invention exploits the proposition that different control structures have different characteristics and if there are bands inside the control loop to limit instantaneous output voltage, it may be possible to control or limit the amplitude of limit cycle oscillations. A number of control structures are known such as the hysteretic, constant on-time and constant off-time control structures of FIGS. 6A-6C, respectively, assuming that the output ripple is dominated by the equivalent series resistance (ESR) of the output capacitor or other filter arrangement.

While the invention will be described in terms of the constant on-time arrangement of FIG. 6B, it should be understood that any of these and other arrangements may be used for practice of the invention. It should also be appreciated from a comparison of any of FIGS. 6A-6C with the exemplary configuration of FIG. 1 (no part of which is admitted to be prior art in regard to the present invention) that the control/feedback loop of each of FIGS. 6A-6C includes a comparator $H_v$ for comparing an output voltage with a reference voltage $V_{ref}$ and providing an output voltage $V_c$ to a further amplifier arrangement (e.g. a hysteresis or difference amplifier) which also receives a substantially triangular waveform that contains the ripple voltage of the output.

Figure 6B:
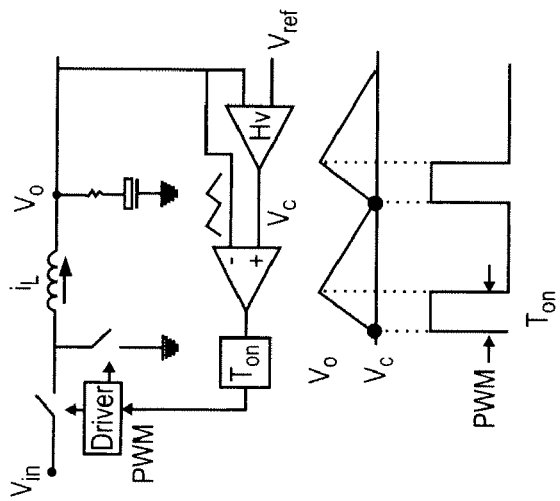
Figure 6C:
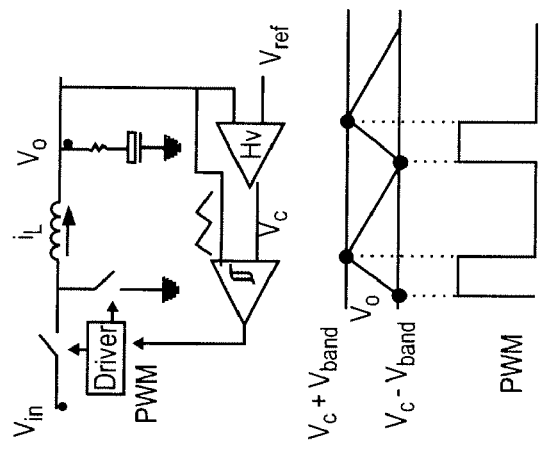
Figure 7:
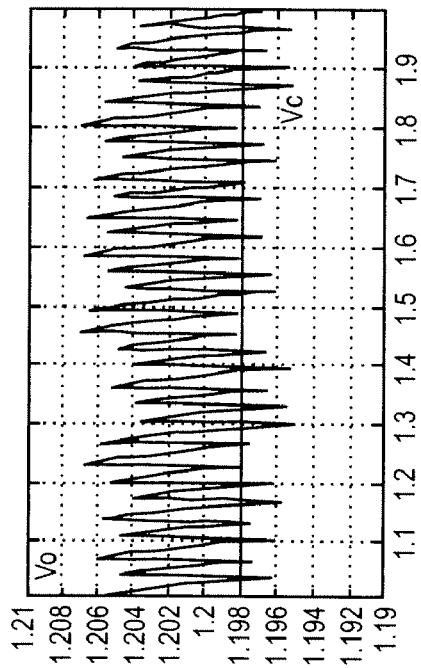
FIG. 7 is a schematic diagram and graph of sampled output voltage for a digitalization of the arrangement of FIG. 6B, as an example of an implementation of the present invention for the particular case where the digital ramp slope $S_d=0$ in accordance with its most basic principles.
Figure 8:
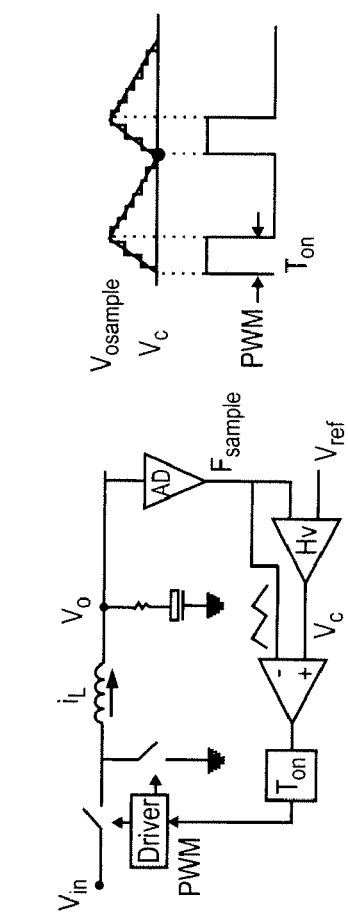
FIG. 8 is a graph of simulated limit cycle oscillations of the arrangement of FIG. 7.

FIG. 7 is identical to FIG. 6B except that digitalization at the constant on-time control is illustrated by the generally triangular ripple waveform being sampled for digital configuration and thus having a "stepped" configuration, labeled $V_{Osample}$. FIG. 8 shows a simulation of the output voltage of the arrangement of FIG. 7 using a fixed control voltage $V_c$ but including $V_{Osample}$. As predicted, although there are limit cycle oscillations at the output voltage, the amplitude of those oscillations is limited by the $V_c$ band, which is determined by:

$$\Delta V_{oscillation} = 1/f_{sample} \cdot ESR \cdot (V_O/L) \tag{3}$$

where L is the value of the power stage inductor. In this simulation, the oscillation amplitude is only 3 mV with a sampling frequency of the output voltage of 1.2 MHZ, which is about four times the switching frequency but several orders of magnitude less than the clock frequency suggested to be required as discussed above with reference to FIG. 4. Therefore even without a high resolution DPWM (which is thus seen to be unneeded), the otherwise unpredictable limit cycle oscillation amplitude is well-controlled by use of $V_{osample}$ in the control loop and is a principal meritorious effect of the invention in accordance with its most basic principles although a somewhat higher sampling frequency (but much reduced from the system clock requirements as discussed above in connection with FIG. 4) is required.

Figure 9:
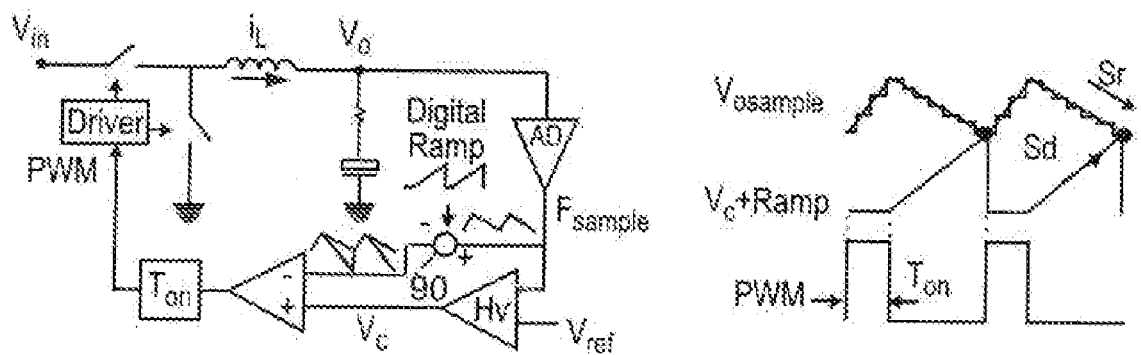
FIG. 9 is a schematic diagram illustrating reduction of the amplitude of the limit cycle oscillations of FIG. 8 in accordance with the invention, FIGS. 10A and 10B graphically illustrate a comparison of simulation of limit cycle oscillations without and with use of a digital ramp as illustrated in FIG. 9, FIGS. 11A and 11B show a graphic comparison similar to that of FIGS. 10A and 10B using a reduced sampling rate through design of the digital ramp.

Nevertheless, use of an increased sampling frequency increases overall cost of A/D converter (ADC) and thus the cost of the controller and, in turn, overall voltage regulator/power converter cost while some oscillation remains, although well-controlled as noted above. In order to further reduce the oscillation amplitude without increasing the cost of the ADC, an additional digital ramp may be added in the control loop signal by any suitable device such as an adder, mixer or difference amplifier 90 as illustrated in FIG. 9, where $S_d$ is the ramp slope and $S_f$ is the output voltage ripple falling slope and $S_d$ is preferably larger than $S_f$. Thus, if $\Delta V_{ADC}/S_d$ is smaller than the sampling period, $1/f_{sample}$, the oscillation amplitude is determined by:

$$\Delta V_{oscillation} = (\Delta V_{ADC}/S_d) \cdot ESR \cdot (V_o/L). \quad (4)$$

Figure 10A:
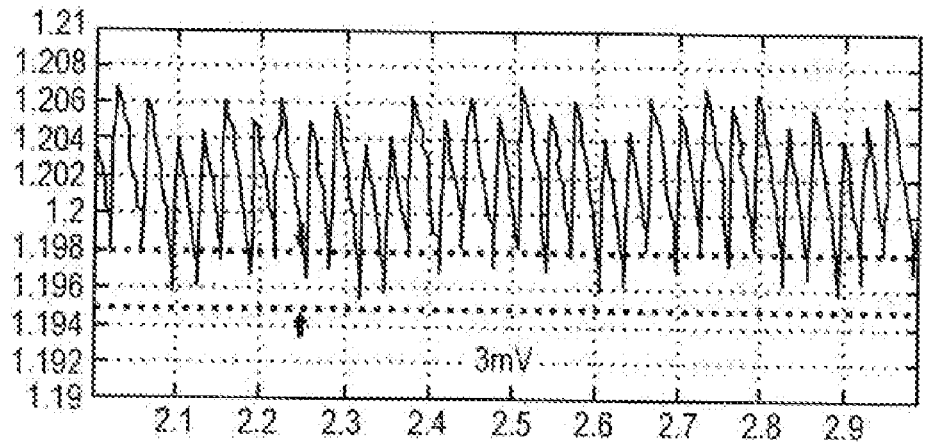
Figure 10B:
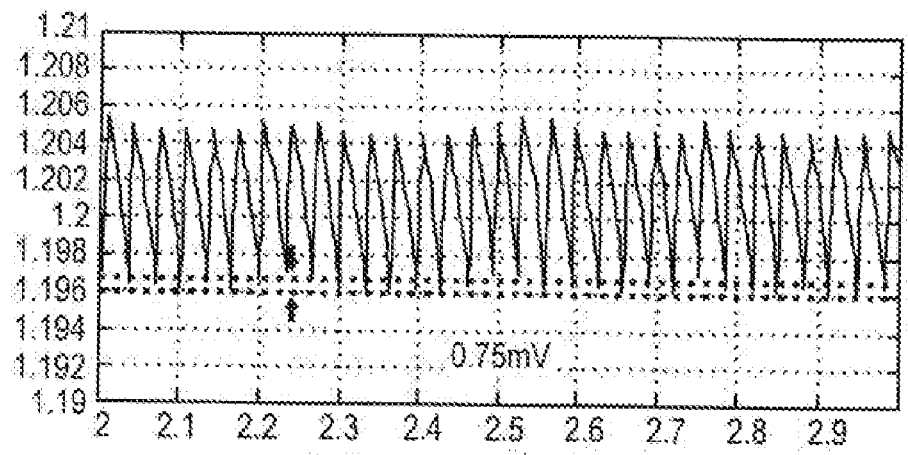

Thus, as $S_d$ is increased, the more the amplitude of the limit cycle oscillation is reduced for a given sampling frequency and, accordingly, the sampling frequency and consequent system cost of the ADC can be reduced. A comparison of the limit cycle oscillations without and with the ramp of FIG. 9 is illustrated in FIGS. 10A and 10B.

Figure 11A:
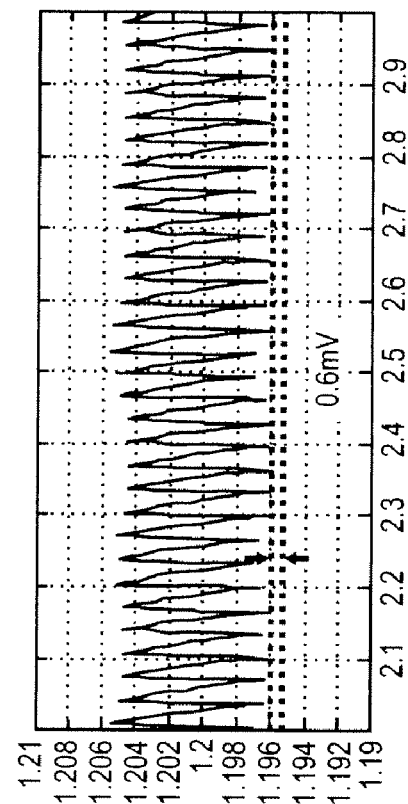
Figure 11B:
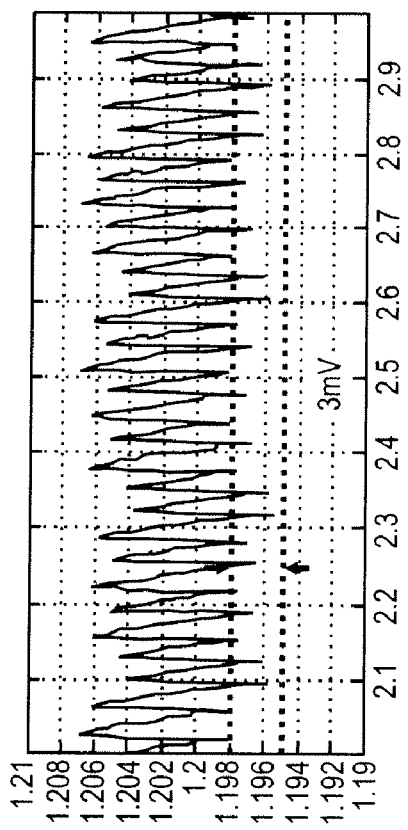

It should be noted that while propagation delay in the inner loop will reduce the transient response of the inner loop, the propagation delay has little influence on the limit cycle oscillation amplitude reduction. As shown in FIGS. 11A and 11B, even when the sampling frequency is reduced to equal the switching frequency, $f_{sw}$, of the power sage, oscillation amplitude can be further reduced through proper ramp design. That is, Equation (4), above, provides the oscillation amplitude calculation and a suitable ramp slope may be determined by how much oscillation can be tolerated. The ramp slope can also be determined empirically or in other ways, as well.

Thus, in summary, the arrangement of FIG. 9, in accordance with a preferred form of the invention, with the buck converter arrangement of FIG. 1, provides (at a switching and sampling frequencies of $f_{sampling} = f_{sw} = 300$ KHz) a reduction of the necessary clock rate, $f_{clock}$, form 1.2 GHz to 1.2 MHz while holding limit cycle oscillation amplitude to under 1 mV whereas the limit cycle oscillation amplitude of the arrangement of FIG. 1, without benefit of the invention is largely unpredictable and uncontrollable.

Figure 12A:
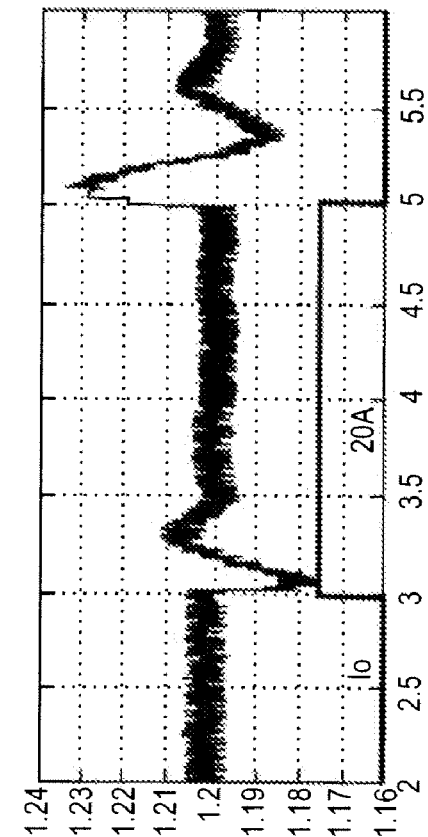
FIGS. 12A and 12B show a graphical comparison of transient response without and with the digital ramp of FIG. 9.
Figure 12B:
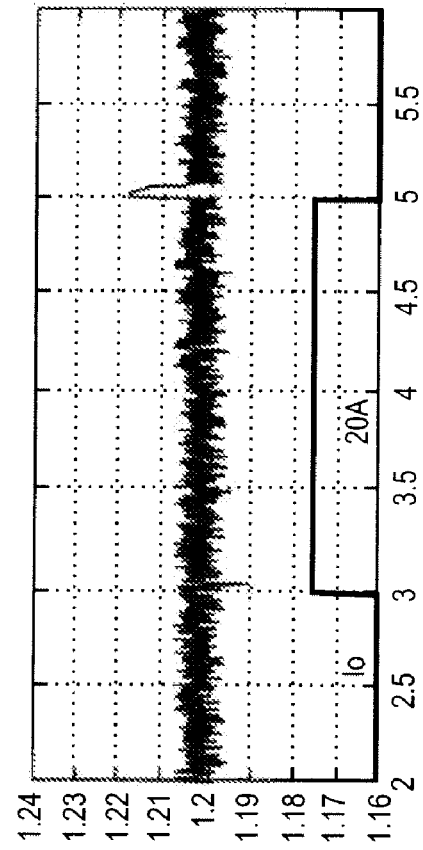

However, it has been found that transient response is somewhat compromised in the arrangement of FIG. 9 including the additional ramp in the control loop. A comparison of the transient response of the arrangement of FIG. 9 without and with the additional ramp waveform in the control loop is illustrated in FIGS. 12A and 12B for $f_{sample} = 4f_{sw}$ and where, in the digital ramp, $S_d = 4S_f$. This compromise of transient response may be attributed to the fact that the outer control loop compensator is principally designed for compensating the DC error of the output voltage and not for transient response. The transient response is thus principally determined by the gain of the pulse width modulator PWM (e.g. whether or not digital, although digital PWMs will also exhibit quantization effects) in the inner loop which is proportional to $1/S_f$. In the control structure of FIG. 9 the gain of the PWM is proportional to $1/(S_f + S_d)$ (e.g. necessarily smaller than $1/S_d$) which results in reduced gain and compromised transient response. (The terminology "inner loop" and "outer loop" as used herein are to be understood as used herein only for identification corresponding to the depiction in the drawings and differentiation of these portions of the control loop from each other and does not imply any particular circuit topology, layout or other electrical or mechanical characteristics thereof.)

Figure 13:
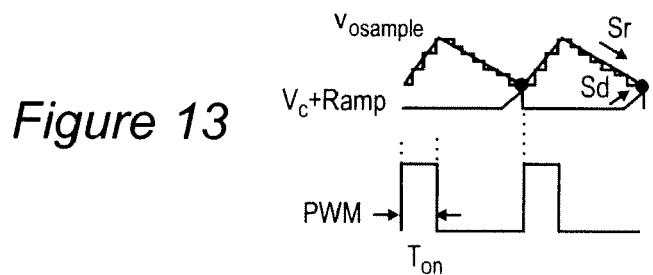
FIG. 13 illustrates a perfecting feature of the invention including a ramp design to improve transient response.
Figure 14A:
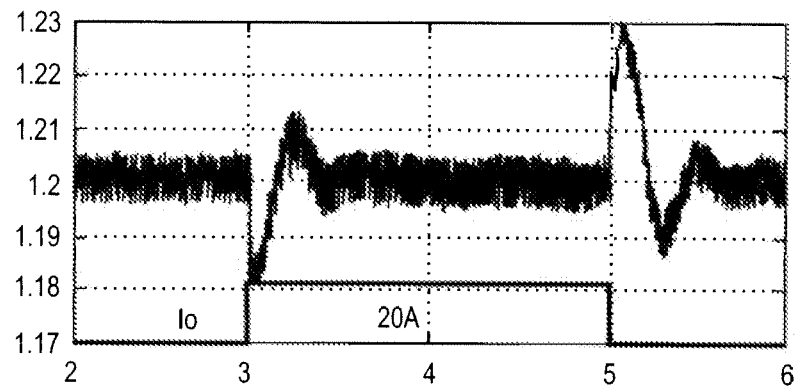
FIGS. 14A and 14B illustrate a comparison of transient response using the digital ramp design of FIG. 13.
Figure 14B:
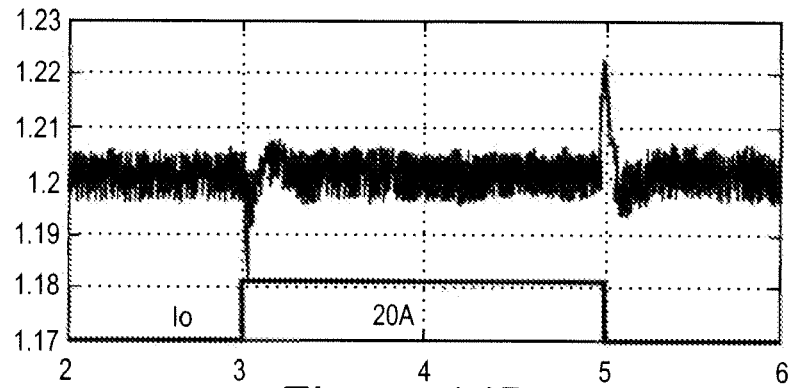

However, to solve this compromise of transient response, a further digital ramp may be added based on the ramp design of FIG. 9 in a small range which can only cover the steady state operation range as shown in FIG. 13, allowing nonlinear modular gain to be realized such that at steady state, the PWM gain is $1/(S_f + S_d)$ which is good for oscillation amplitude reduction/control while at a load transient, the gain is substantial equal to $1/S_f$. Thus, as shown in the graphical comparison of FIGS. 14A and 14B, the transient response on of FIG. 14B approximates the transient response of FIG. 12A, representing the transient response of the arrangement of FIG. 7, without the digital ramp of FIG. 9.

Figure 15:
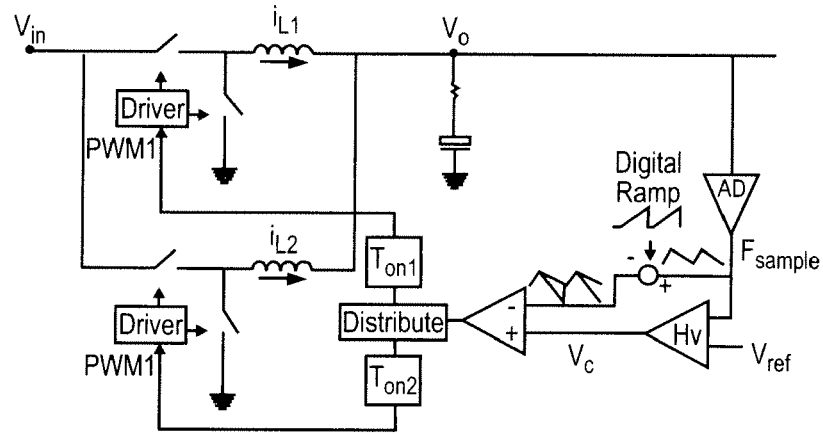
FIG. 15 is a schematic diagram illustrating an exemplary application of the invention to a multi-phase voltage regulator/power converter.

In view of the foregoing, it is seen that the invention provides for good voltage regulation with good control and limitation of amplitude of limit cycle oscillations which are unavoidable when a low resolution DPWM is used to simplify voltage regulator/power converter designs without requiring additional chip space or other design trade-offs to provide increased effective DPWM resolution and reduce voltage regulator/power converter costs. The invention may be embodied simply as shown in FIG. 7 to provide control of limit cycle oscillation amplitude or enhanced in accordance with the embodiments respectively illustrated in FIG. 9 and/or 13 to provide additional oscillation amplitude reduction as well as reduction in sampling frequency with or without limitation or substantial avoidance of compromise of transient response. The invention can be applied to other duty cycle modulation arrangements such as those of FIGS. 6A and 6C as well as other arrangements as will be evident to those skilled in the art as well as other converter topologies other than the exemplary buck converter topology illustrated. Moreover, any of those arrangements and or topologies may be implemented using as many phases as may be desired for a particular application or power requirement specification as illustrated, for example, in FIG. 15, in which the output of the control loop is distributed to each phase of the voltage regulator/power converter.

While the invention has been described in terms of a single preferred embodiment, those skilled in the art will recognize that the invention can be practiced with modification within the spirit and scope of the appended claims.

Having thus described my invention, what we claim as new and desire to secure by Letters Patent is as follows:

1. A power converter including digital pulse width modulator of low resolution such that limit cycle oscillation occur, said power converter including:
   a feedback control arrangement for controlling said digital pulse width modulator including:
   a sampling arrangement and analog to digital converter,
   an outer control loop for comparing a sampled output voltage of said power converter with a reference voltage and providing a digital output corresponding to an average difference between said sampled output voltage and said reference voltage, and
   an inner control loop including an arrangement for providing a signal corresponding to a difference between said output voltage and said output of said outer control loop.

2. The power converter as recited in claim 1, wherein said digital pulse width modulator provides hysteretic control.

3. The power converter as recited in claim 1, wherein said digital pulse width modulator provides constant on time control.

4. The power converter as recited in claim 1, wherein said digital pulse width modulator provides constant off time control.

5. The power converter as recited in claim 1, wherein said signal provided by said inner loop is a digitized ripple waveform.

6. The power converter as recited in claim 5, wherein said digitized ripple waveform is a stepped triangular waveform.

7. A power converter as recited in claim 1, further including means for adding a ramp signal to a signal in said inner feedback loop.

8. The power converter as recited in claim 7, wherein said digital pulse width modulator provides hysteretic control.

9. The power converter as recited in claim 7, wherein said digital pulse width modulator provides constant on time control.

10. The power converter as recited in claim 7, wherein said digital pulse width modulator provides constant off time control.

11. The power converter as recited in claim 7, wherein said signal provided by said inner loop is a digitized ripple waveform.

12. A power converter as recited in claim 7, wherein said ramp signal is added in a small range which corresponds to steady-state operation but not transients.

13. The power converter as recited in claim 12, wherein said digital pulse width modulator provides hysteretic control.

14. The power converter as recited in claim 12, wherein said digital pulse width modulator provides constant on time control.

15. The power converter as recited in claim 12, wherein said digital pulse width modulator provides constant off time control.

16. The power converter as recited in claim 12, wherein said signal provided by said inner loop is a digitized ripple waveform.

17. A method of voltage regulation using a switched voltage regulator controlled by a digital pulse width modulator of low resolution such that limit cycle oscillations occur responsive to an output voltage of said voltage regulator, said method comprising steps of provadiing a digital signal corresponding to a comparison of a sampled average of the output voltage of said voltage regulator with a reference voltage in an outer feedback loop to said digital pulse width modulator, providing a signal corresponding to a difference between a sampled output voltage of said voltage regulator and said average of said sampled output voltage of said voltage regulator in an inner feedback loop to said digital pulse width modulator.

18. The method as recited in claim 17, comprising the further step of adding a ramp signal to said signal in said inner feedback loop.

19. The method as recited in claim 18, wherein said ramp signal is added in a small range which corresponds to steady-state operation but not transients.

* * * * *